United States Patent
Farley et al.

(10) Patent No.: US 9,370,174 B2
(45) Date of Patent: *Jun. 21, 2016

(54) SINKER FOR FISHING (71) Applicant: Langley Innovations Pty Ltd., Brisbane (AU)

(72) Inventors: Scot Farley, Gumdale (AU); Robert John Lange, Glenlee (AU)

(73) Assignee: Langley Innovations Pty Ltd., Brisbane, QLD (AU)

( * ) Notice: Subject to any disclaimer, the term of this patent is extended or adjusted under 35 U.S.C. 154(b) by 137 days.

This patent is subject to a terminal disclaimer.

(21) Appl. No.: 14/151,370

(22) Filed: Jan. 9, 2014

(65) Prior Publication Data

US 2014/0123541 A1    May 8, 2014

Related U.S. Application Data (63) Continuation-in-part of application No. 13/122,429, filed as application No. PCT/AU2009/001317 on Oct. 2, 2009, now Pat. No. 8,656,634.

(30) Foreign Application Priority Data

Oct. 3, 2008   (AU) ................................ 2008905165

(51) Int. Cl.
*A01K 95/00* (2006.01)
*A01K 93/00* (2006.01)
*A01K 95/02* (2006.01)

(52) U.S. Cl.
CPC .................. *A01K 95/00* (2013.01); *A01K 93/00* (2013.01); *A01K 95/02* (2013.01)

(58) Field of Classification Search
CPC ....... A01K 93/00; A01K 95/00; A01K 95/02; A01K 91/03; A01K 85/00; A01K 85/02; A01K 91/04; A01K 91/047; A01K 97/02; A01K 91/053; A01K 97/00; A01K 75/06; A01K 97/12; A01K 99/00; A01K 75/04; A01K 71/00

See application file for complete search history.

(56) References Cited

U.S. PATENT DOCUMENTS

| 1,240,043 | A |   | 9/1917  | Gregory et al. |
|-----------|---|---|---------|----------------|
| 1,489,088 | A |   | 4/1924  | McMindes |
| 2,754,616 | A |   | 7/1956  | Law |
| 2,958,153 | A |   | 11/1960 | Yerman et al. |
| 3,107,451 | A | * | 10/1963 | Sitzler .................... A01K 93/00 43/43.14 |
| 3,293,792 | A | * | 12/1966 | Bittaker, Jr. ............ A01K 93/00 43/44.89 |

(Continued)

FOREIGN PATENT DOCUMENTS

| DE | 1016053 A | 9/1957 |
|----|-----------|--------|
| GB | 2170682 A | 8/1986 |

*Primary Examiner* — Darren W Ark
*Assistant Examiner* — George Andonyan
(74) *Attorney, Agent, or Firm* — Stephen T. Scherrer; Monique A. Morneault; Scherrer Patent & Trademark Law, P.C.

(57) ABSTRACT

A sinker or float that releasably clamps around a line, such as a fishing line, including two members shaped to define a channel for the line when in a closed position. A locking means is provided to releasably lock the two members in the closed position. Each of the members has at least a portion of high or low density material to provide a sinking or floating effect. A jacket may be provided that retains the high or low density material therein. The jacket may also include a hinge portion such that the two members can be hingedly opened and closed.

15 Claims, 11 Drawing Sheets

(56) References Cited

U.S. PATENT DOCUMENTS

| | | | | |
|---|---|---|---|---|
| 3,974,591 A * | 8/1976 | Ray | ................ | A01K 97/02 43/43.14 |
| 4,251,941 A * | 2/1981 | Howard | ................ | A01K 93/00 43/43.11 |
| 4,361,976 A * | 12/1982 | Svoma | ................ | A01K 95/00 43/43.1 |
| 4,426,804 A | 1/1984 | Hutson | | |
| 4,563,831 A | 1/1986 | Gibney | | |
| 5,197,912 A * | 3/1993 | Lengefeld | ................ | A01K 75/04 441/133 |
| 5,440,831 A * | 8/1995 | Chandler | ................ | A01K 93/00 43/43.11 |
| 7,481,020 B1 * | 1/2009 | Ruzicka | ................ | A01K 93/00 43/43.14 |
| 8,505,232 B2 | 8/2013 | Reynolds et al. | | |
| 2005/0011107 A1 * | 1/2005 | Hiragaki | ................ | A01K 91/053 43/44.9 |
| 2007/0199235 A1 * | 8/2007 | Yu | ................ | A01K 97/02 43/44.99 |
| 2008/0034640 A1 | 2/2008 | Naerheim et al. | | |
| 2009/0188151 A1 | 7/2009 | Bartholomew | | |
| 2009/0293338 A1 * | 12/2009 | Lu | ................ | A01K 75/06 43/9.8 |

\* cited by examiner

SINKER FOR FISHING

CROSS-REFERENCE TO RELATED APPLICATIONS

This application is a continuation-in-part of U.S. patent application Ser. No. 13/122,429 filed on Apr. 4, 2011, which claims priority to PCT/AU2009/001317, filed on Oct. 2, 2009, which claims priority to Australia Patent Application No. 2008905165 filed Oct. 3, 2008.

FIELD OF THE INVENTION

The present invention generally relates to sinkers, and more particularly to releasable sinkers used on fishing lines.

BACKGROUND ART

Sinkers are high density weights used in fishing attached to a fishing line to force a line with a hook, lure, and/or bait to sink in water. Sinkers are also used in some cases to increase the distance that a fishing line may be cast. Sinkers come in a variety of different shapes and sizes, including generally spherically, cylindrical, and conical shapes.

To enable sinkers to be fastened to the line, a bore is typically provided in the sinker through which the line traverses, and then the line is typically tied off. A disadvantage of this method of fastening the sinker to the line is that it is relatively complex to apply. Yet a further disadvantage is that if a sinker is to be removed or replaced, it is usually easier to cut the line than it is to untie the line and remove/replace the sinker. This is inconvenient, time consuming, and also unnecessarily uses up fishing line as the cut portion is wasted.

Sinkers are sometimes provided with a wedge shaped cut which receives the line, but to prevent the sinker from coming free of the line it is necessary to crimp the sinker around the line using a tool. Although this assists in applying a sinker to a line, it does not help with removing a sinker from a line, and also means the sinker is not reusable. Still further, this method normally attaches the sinker to the line at the location of the crimping meaning that the sinker can no longer "run" along the line and, in some cases, the crimping action can damage or weaken the line, sometimes leading to line breakages.

Similar disadvantages are known for fishing line floats and, it is a disadvantage that fishers usually have to carry both sinkers and floats separately even through the methods of attaching, removing and replacing floats are fundamentally similar to that for sinkers (e.g. attaching around a line).

It is an aim of this invention to provide an improved sinker for fishing which overcomes or ameliorates one or more of the disadvantages or problems described above, or which at least provides a useful alternative.

SUMMARY OF THE INVENTION

According to a broad aspect of the invention, there is provided a sinker or float that releasably clamps around a line, comprising two members shaped to define a channel for the line when in a closed position, each member comprising at least a portion of high or low density material (to provide a sinking or floating effect respectively), and a locking means for releasably locking the two members in the closed position.

According to an aspect of the invention, there is provided a sinker or float that releasably clamps around a line, comprising two members, wherein at least one of the members has a raised portion and the other member a corresponding recessed portion for receiving the raised portion when the two members are in a closed position, and when in the closed position an inner surface of at least one of the members is shaped to define a channel for the line, the members each substantially comprising a portion of high or low density material (to provide a sinking or floating effect respectively) and having a jacket of a different material that retains the high or low density material and comprises a locking means for releasably locking the two members in the closed position.

According to another aspect of the invention, there is provided a sinker or float that releasably clamps around a line, comprising two hinged members, wherein at least one of the members has a raised portion and the other member a corresponding recessed portion for receiving the raised portion when the two hinged members are in a closed position, and when in the closed position an inner surface of at least one of the members is shaped to define a channel for the line, the hinged members each substantially comprising a portion of high or low density material (to provide a sinking or floating effect respectively) and having a jacket of a different material that retains the high or low density material and comprises a locking means for releasably locking the two hinged members in the closed position.

The jacket preferably substantially covers at least the outer surface of the high or low density material, and is preferably made of plastic. The jacket may cover the outer surfaces of the high or low density material in its entirety when in the closed position, or may complete encase the high or low density material. This not only protects the high or low density material, but also prevents the elements from the high or low density material (e.g. if the high or low density material is considered toxic, or the like). Alternatively, the high or low density material may have a further cover or coating. The jacket, encasement, cover, and/or coating of the high or low density material may be applied by overmoulding or powdercoating, or the like.

The jacket may be coloured and/or have branding or advertising stamped, moulded, affixed, or printed on/in it. This list is not exhaustive and it is envisaged that other methods of applying branding or advertising could also be used.

The jacket may be shaped to receive and retain the high or low density material, or may have apertures to receive a corresponding portion of the high or low density material to retain the high or low density material within the jacket. Preferably, the jacket is shaped to align the high or low density material in a particular orientation. For example, the jacket may have a protrusion such as a rib that is received by a corresponding recess in the high or low density material, and/or the jacket may be asymmetrical.

Preferably, the high or low density material can be removed, changed, and replaced in the jacket, but it is also envisaged that the high or low density material may be affixed in the jacket. The jacket may be resilient so that the high or low density material is easily placed and subsequently retained in the jacket. Furthermore, the jacket may be temporarily deformable to facilitate removal of the high or low density material.

The jacket will typically have a pair of corresponding openings (normally an opening on each jacket portion) with each of the pair on opposed sides of the jacket and the openings aligned with the channel in the high or low density material block. These openings may be adapted to lightly grip the line when it extends through the openings in order to positively locate the sinker relative to the line and maintain its position or the openings may be spaced from the line to allow a free running sinker.

The locking means preferably comprises a tab on at least one of the members that clips onto or into a corresponding portion of the other member. The tab may also comprise an opening or slit that receives a protrusion of the other member. The tab will normally have a shoulder portion which engages with a corresponding portion of the opening or slit. The locking means may be opened or disengaged by manipulation of the locking means (which as it will typically be made of plastic, will normally have a small degree of resilience).

Preferably, each member has a raised portion and the other member a corresponding recessed portion for receiving the raised portion when the two members are in a closed position and, even more preferably, the raised and recessed portions extend substantially along the length of the high or low density material portion of the members. Furthermore, it is preferable that the raised and recessed portions of each member are adjacent the channel.

The channel may be straight and/or sized to provide minimal friction between the channel and the line, or may be shaped and/or sized to increase the friction. The channel may even have a restricted, or "clamping" portion to provide considerable friction between the channel and the line. The characteristics of the channel therefore control how the sinker/float interacts with the line. For example, with a straight channel that is larger than the line, the sinker/float will freely traverse the line (e.g. if a sinker is clamped around a line, the sinker will run down the line without the line having to be removed or reeled in). In contrast, with a channel that is a tight fit on the line (or shaped in a manner to prevent free movement of the line), the sinker/float will be locked at the position on the line that it is applied to.

Typically, in the case of a sinker, the high density material is lead. This is not to be regarded as limiting however, and the high density material could be any suitable material including tin, bismuth, steel, tungsten-nickel alloy, and tungsten filled nylon. The low density material on the other hand, may include not only low density materials (such as polystyrene), but also hollow members such as a flotation chamber, or a hollow plastic member.

Preferably, the two hinged members are hinged by a flexible or resilient portion of the jacket. The hinge is preferably a live hinge and may either protrude externally or be recessed. Alternatively, the hinge may be a different part or material.

Preferably, the sinker/float is reusable. To remove the sinker/float the locking means is disengaged and the sinker/float is removed from the line. As no part of the sinker/float is substantially deformed after use, it can be reapplied to a line as it first was.

The sinker/float may be used in either commercial or domestic applications and can be sized accordingly. The size of the sinker/float is therefore not to be regarded as limiting.

In order that the invention may be more readily understood and put into practice, one or more embodiments thereof will now be described, by way of example only, with reference to the accompanying drawings.

BRIEF DESCRIPTION OF THE DRAWINGS

FIG. 14 is a plan view of the preferred jacket and material portions removed from the respective jacket portions but aligned.

FIG. 14 A is a detailed view of the material portion in the region identified by reference numeral "B" in FIG. 14.

FIG. 14 B is a detailed view of the jacket portion in the region identified by reference numeral "B" in FIG. 14.

DETAILED DESCRIPTION

Figure 1:
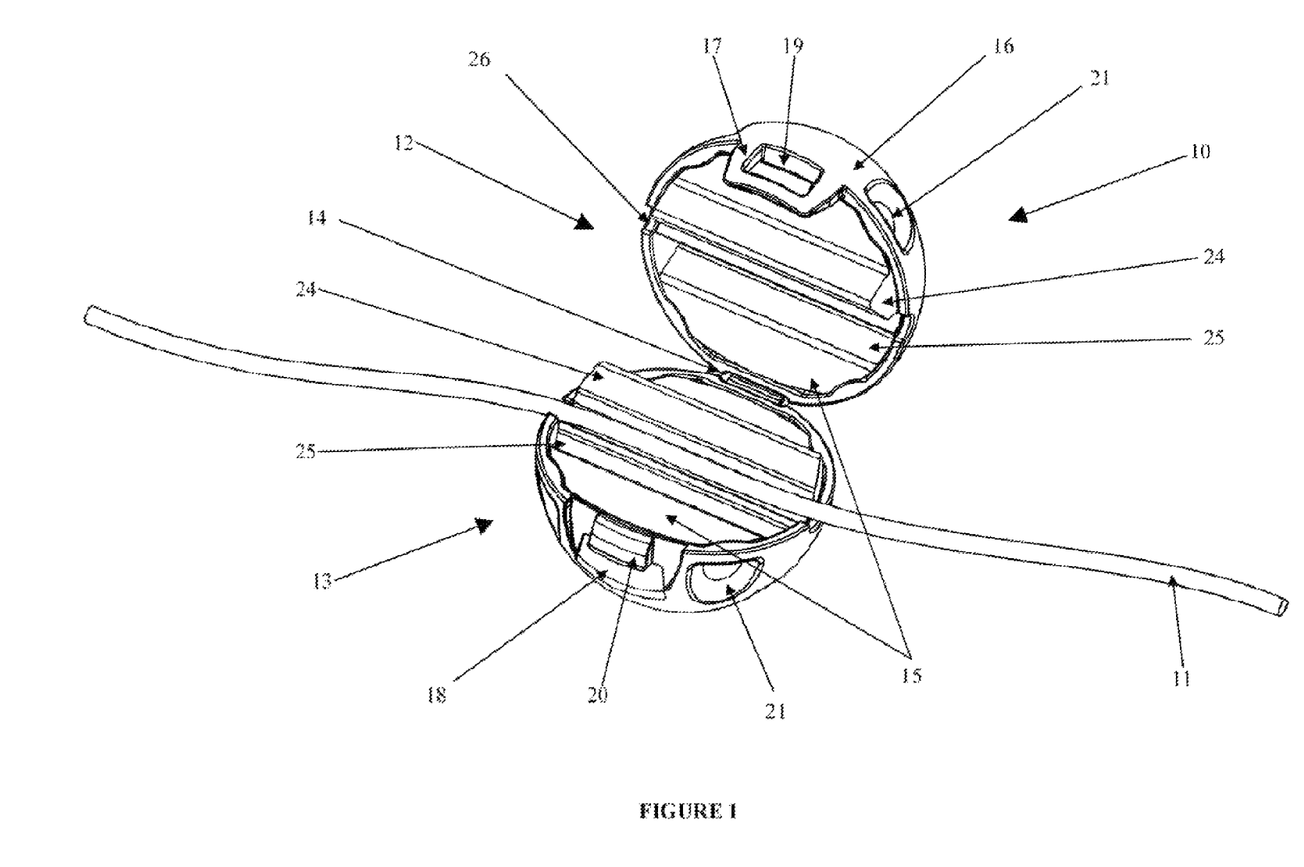
FIG. 1 illustrates a perspective view of a sinker (or float) in an open position with a line passing through it.
Figure 2:
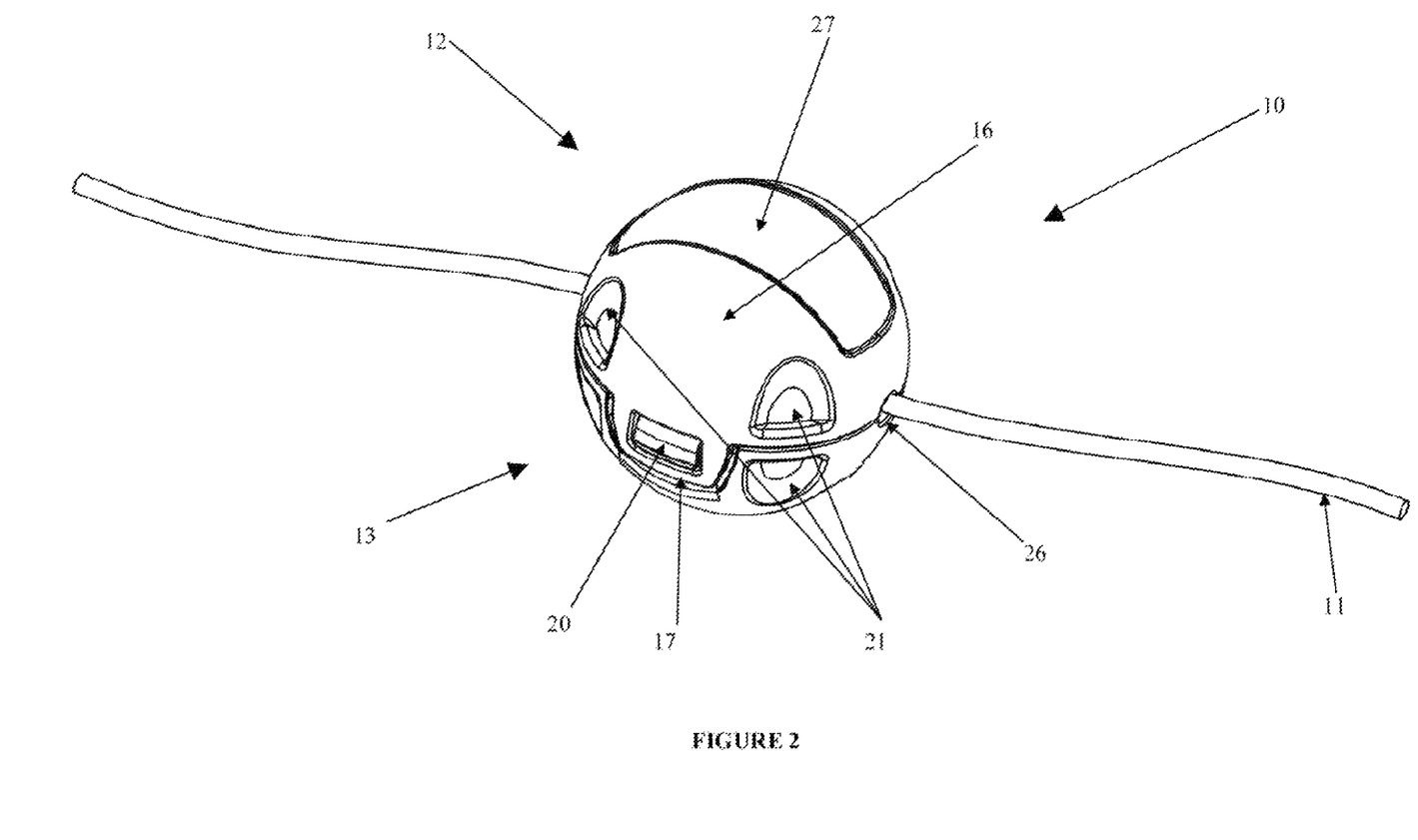
FIG. 2 illustrates a perspective view of the sinker in FIG. 1 in the closed position.
Figure 3:
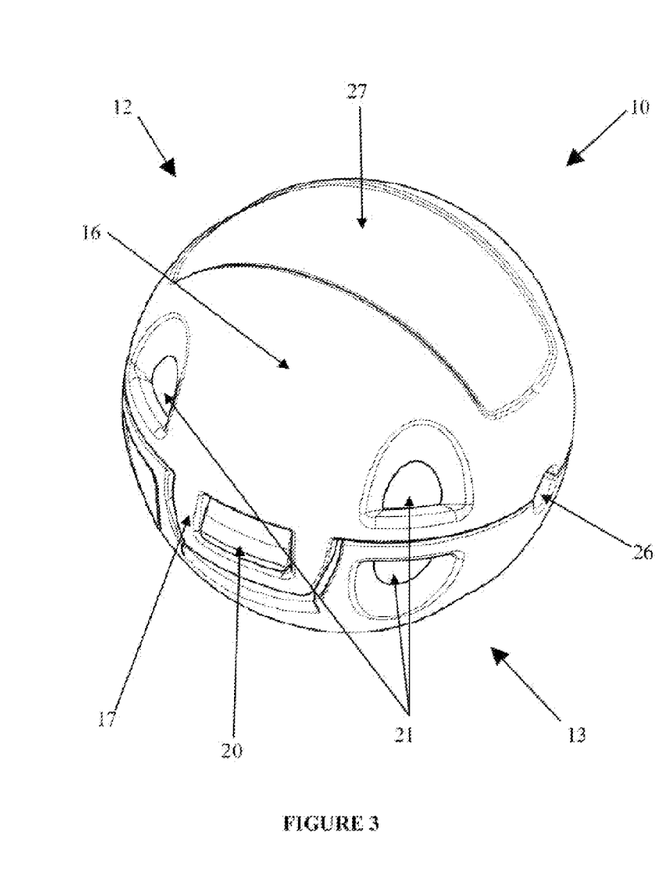
FIG. 3 illustrates a front perspective view of the sinker in FIG. 1 in the closed position.
Figure 4:
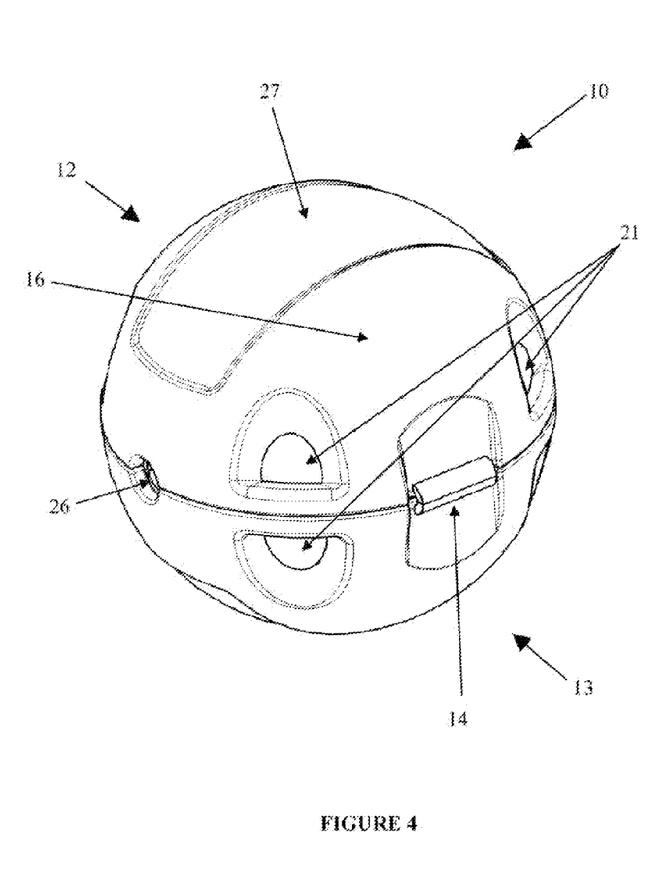
FIG. 4 illustrates a rear perspective view of the sinker in FIG. 1 in the closed position.
Figure 5A:
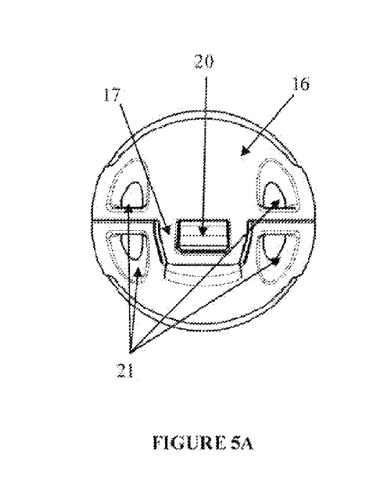
FIG. 5A illustrates a front elevation view of the sinker in FIG. 1 in the closed position.
Figure 5B:
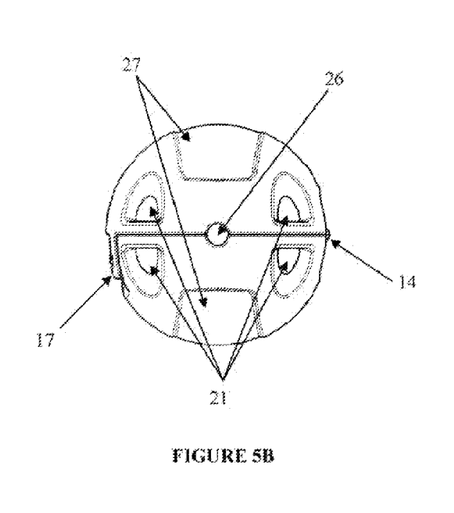
FIG. 5B illustrates a side elevation view of the sinker in FIG. 1 in the closed position.
Figure 5C:
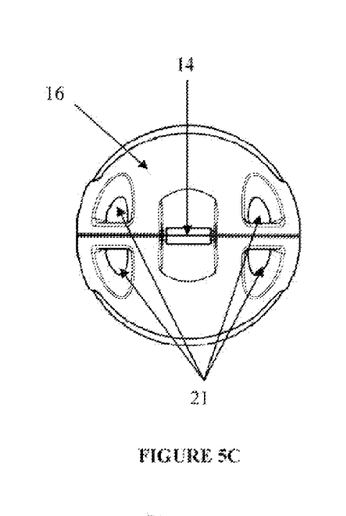
FIG. 5C illustrates a rear elevation view of the sinker in FIG. 1 in the closed position.
Figure 5D:
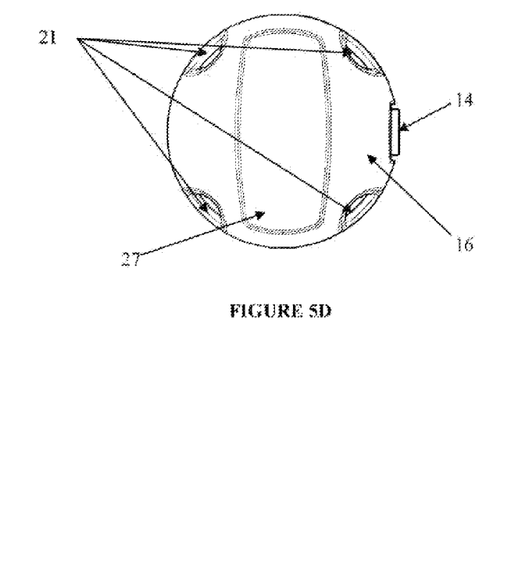
FIG. 5D illustrates a top plan view of the sinker in FIG. 1 in the closed position.
Figure 5E:
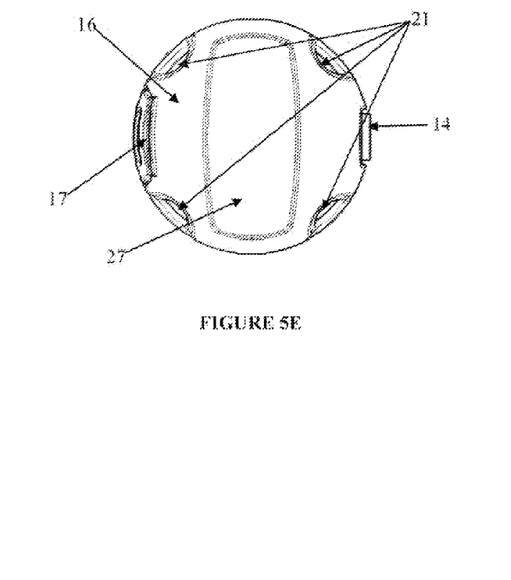
FIG. 5E illustrates a bottom plan view of the sinker in FIG. 1 in the closed position.
Figure 6:
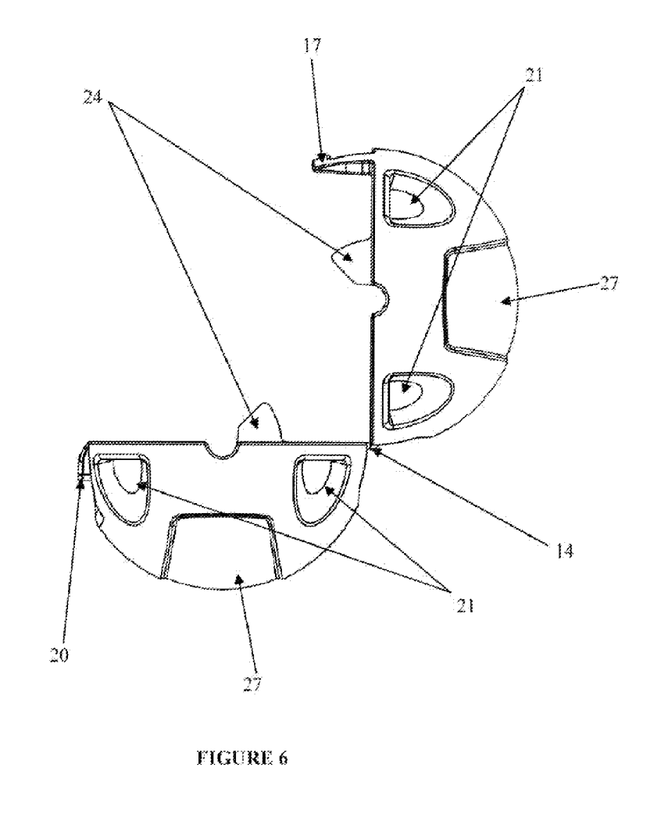
FIG. 6 illustrates a side elevation view of the sinker in FIG. 1 in the open position.
Figure 7:
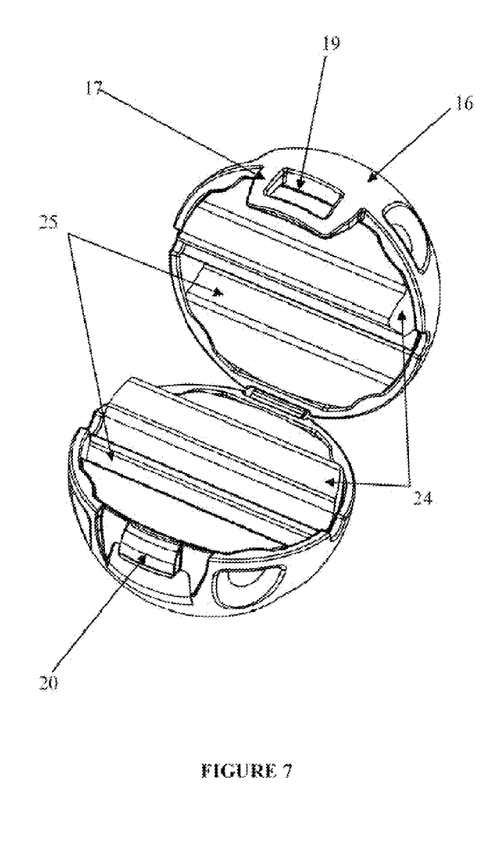
FIG. 7 illustrates a front perspective view of the sinker in FIG. 1 in the open position.

FIGS. 1 illustrates a sinker 10 in an open position that can releasably clamp around a line 11. The sinker 10 (or float, but hereinafter referred to primarily as a sinker only) comprises two members, an upper half 12 and a lower half 13. In the embodiment illustrated in FIGS. 1 to 8, the halves 12 and 13 are hinged about point 14 such that the two halves 12 and 13 can open, receive a line 11, and close around or on the line 11 (e.g. as seen in FIG. 2).

Each of the halves 12 and 13 comprise an inner 15 made of a high or low density material. The density of the inner material 15 largely determines whether the sinker 10 sinks of floats in water. For example, if the inner material 15 is high density (e.g. lead) the sinker 10 will sink in water, and if the inner material 15 is low density (e.g. a floatation chamber or hollow plastic member) the 'sinker' 10 will instead be a float (although this is referred to as a 'sinker', no limitation is meant thereby).

Each half 12 and 13 also has a jacket 16 that receives and retains the inner material 15. The jacket 16 is preferably made of plastic, or any other suitable material, such that the halves 12 and 13 are hinged at point 14 by a flexible or resilient portion of the jacket 16. The jacket 16 may be made entirely of a flexible or resilient material, or alternatively, only the hinged point 14 may be flexible or resilient. The hinge is preferably a live hinge and may either protrude externally, or be recessed (as shown in the figures).

The jacket 16 also has a locking means in the form of a tab 17 on the upper half 12 that locks with a corresponding portion 18 on the lower half The locking tab 17 has an aperture 19 which receives a protrusion 20 on the corresponding portion 18 as shown in FIGS. 2 to 5 and FIG. 8. It is envisaged that other locking means could also be implemented, such as a locking tab without an aperture that engages with a lip or edge on the lower half, or a hook, latch, twisted tie, etc.

The jacket has apertures, or eyelets, 21 that receive a corresponding portion of the inner material 15 and retain the material 15 within the jacket 16. The jacket 16 also preferably is shaped to align the inner material 15. This is shown as an indentation in FIG. 8, and also as a ridge 22 in FIG. 9 that is received by a corresponding depression 23 in the inner material 15 (although FIG. 9 is for a different embodiment this feature could also apply to the embodiment shown in FIGS. 2 to 8).

Figure 8:
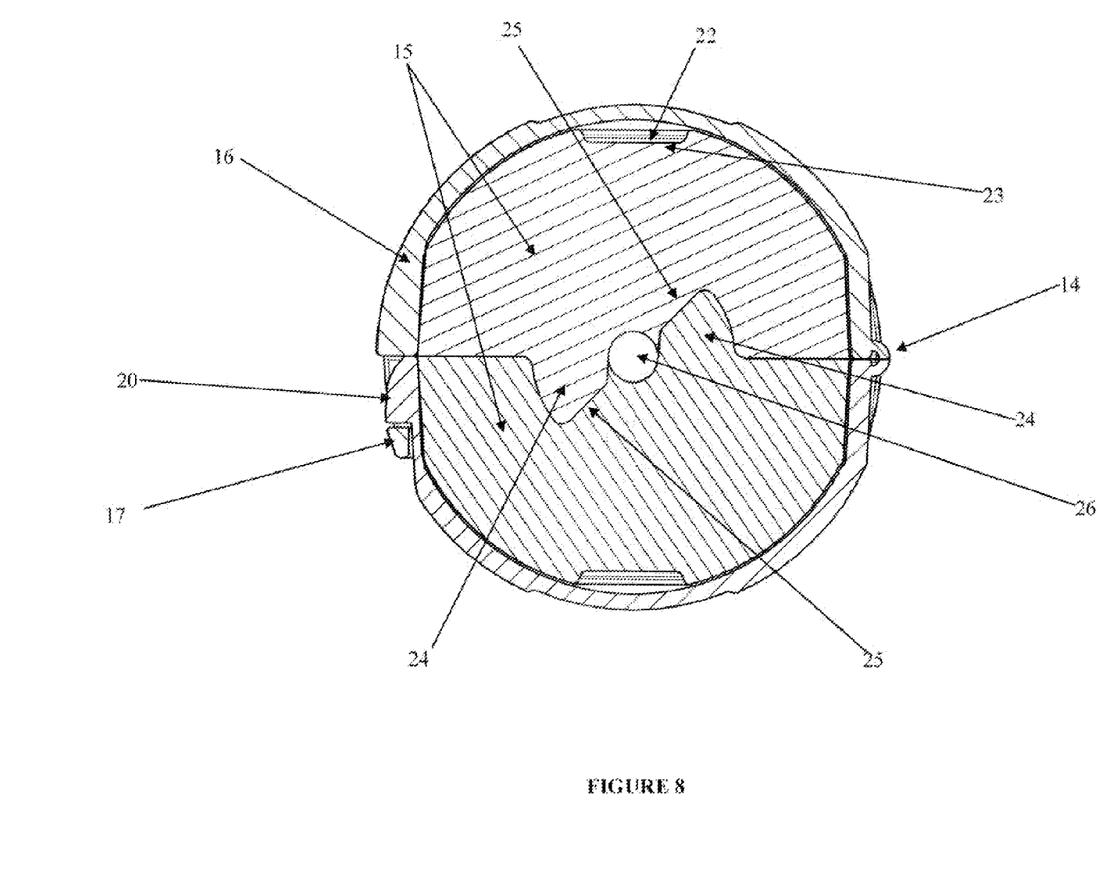
FIG. 8 illustrates a cross section view of the sinker in FIG. 1 in the closed position.

Each of the halves 12 and 13 have a raised portion 24 which is received by a corresponding recessed portion 25 when the sinker 10 is in the closed position (this is best illustrated in FIG. 8). When the two halves 12 and 13 are in the closed position, the inner surface of the two halves 12 and 13 defines a channel 26 through which the line 11 passes (also best illustrated in FIG. 8). The raised and recessed portions 24 and 25 are adjacent the channel 26 to facilitate aligning the line 11 with the channel 26, and also to prevent the line 11 from wedging in the channel 26.

A further advantage of the raised and recessed portions 24 and 25 is that they provide the sinker 10 with more support and strength in the closed position. For example, any force applied to one half is spread across the hinge 14, the locking tab 17, and the raised and recessed portions 24 and 25, as opposed to just the hinge 14, the locking tab 17. As the hinge 14 and locking tab 17 are made of plastic, the added strength/support of the raised and recesses portions 24 and 25 can therefore be significant.

Figure 9:
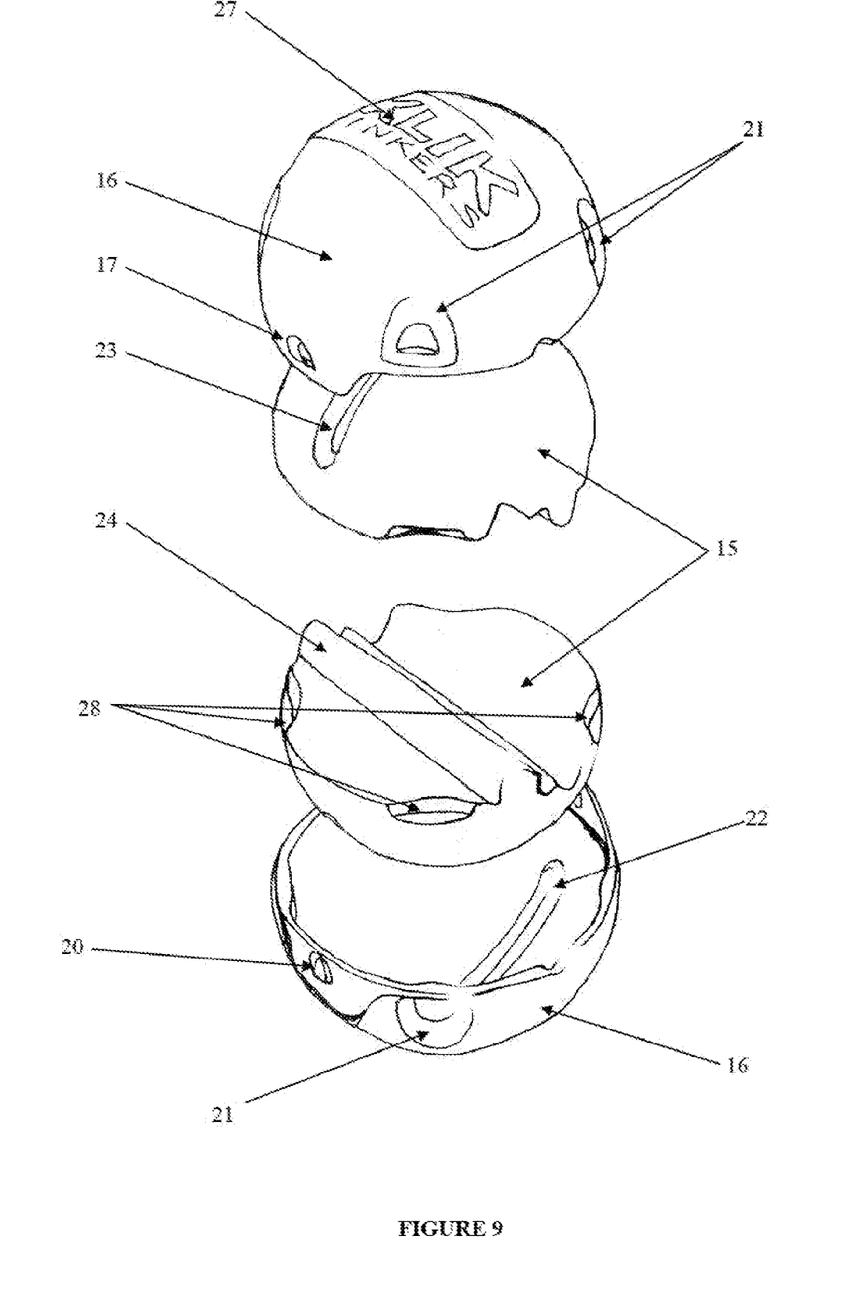
FIG. 9 illustrates an exploded view of a sinker according to a different embodiment.

As illustrated in FIGS. 2 to 4, 5D, 5E, and 9 a surface 27 is provided on which branding or advertising can be stamped, moulded, printed, or attached to. An example with branding present is illustrated in FIG. 9. Furthermore, the jacket 16 may be coloured and/or textured to provide a particular look and feel sinker, other than could usually be provided with a standard single material sinker, such as those made of lead. For example, the jacket 16 may be coloured to indicate different size or weight sinkers, and may be textured to provide additional grip to the operator.

Illustrated in FIG. 9 is a different embodiment of the invention. The embodiment in FIG. 9 does not have a hinge or hinged portion 14, and instead is in two discrete halves which clip together. Other than having an addition locking means instead of a hinge, the embodiment in FIG. 9 is very similar to that illustrated in FIGS. 1 to 8. It can be realised from FIG. 9 that the inner material 15 can be removed from the jacket 16 and replaced relatively easily. The inner material 15 is aligned by the ridge 22 and depression 23. The area surrounding the apertures 21 of the jacket 16 are temporarily deformed (pushed back) to allow the inner material 15 to pass and then return to their original position holding the inner material 15 in place. The inner material may have indentations 28 which correspond with the portion of the jacket 16 surrounding the apertures 21, the indentations 28 aid to enable engagement of the inner material 15 by the jacket 16.

Although the only view of the inner material 15 separated from the jacket 16 is shown in the embodiment shown in FIG. 9, this is not to be regarded as limiting as the inner material 15 could also be removed from the jacket 16 shown in the embodiments in FIGS. 1 to 8 in a similar manner. The removal and replacement of the inner material 15 allows not only replacement of the inner material if it gets damaged (e.g. corroded), but also allows the nature of the sinker 10 to be changed by inserting a different inner material 15. For example, the inner material 15 could be easily changed from a high density material to a low density material, or vice versa.

In use, the sinker 10 of the invention can quickly and easily be placed on a line 11 by opening the sinker 10 (if it is closed), placing the line 11 in the channel 26, closing the sinker 10, and using the sinker 10 as desired. Then, to remove the sinker, the sinker 10 is opened and removed from the line 11. No cutting, tying, or alteration of the line is necessary to apply or remove the sinker 10. Furthermore, the sinker 10 is completely reusable. The sinker can even be applied when the line is in use. For example, if the bait is moving with current, a sinker 10 can be added to the line above water and it will run down the line to the trace.

Although the sinker 10 has typically been explained with use to being applied around a line, it is also envisaged that the sinker 10 could be constructed so that it is applied onto the line (i.e. does not move on the line). This could be affected by changing the diameter or layout of the channel, or by adding a clamping, or restricted portion.

The sinker 10 may be scaled up or down to match any appropriate situation, including both commercial and/or domestic applications. The size of the sinker 10 can be altered to accommodate different lines, and or suit the sinker 10 for different applications. The materials described above are not to be regarded as limiting as other suitable materials that are readily available could also be used.

FIGS. 10 to 15 are directed towards identifying a particularly preferred engagement between the material portions and the respective jacket portions. The embodiment illustrated in FIGS. 10 to 15 is largely the same as the embodiment illustrated in FIGS. 1 to 9 but with enhanced detail of the engagement.

Figure 10:
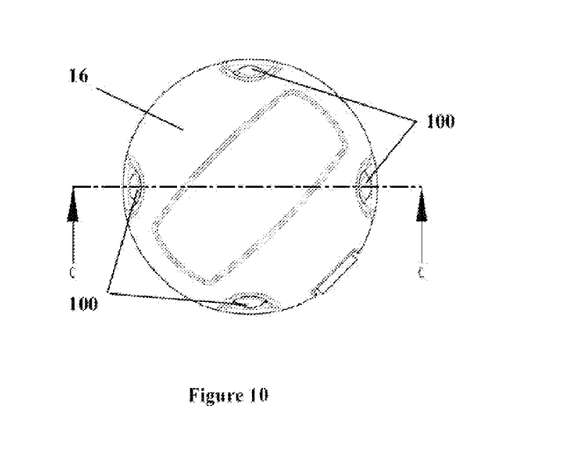
FIG. 10 is a plan view of a sinker according to one preferred embodiment.
Figure 11:
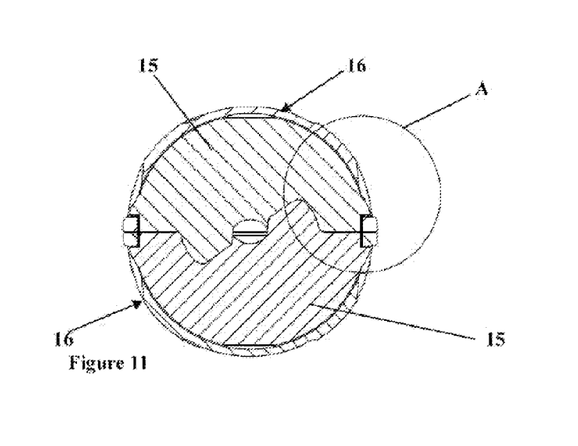
FIG. 11 is a sectional view of the sinker illustrated in FIG. 10 along line C-C.
Figure 12:
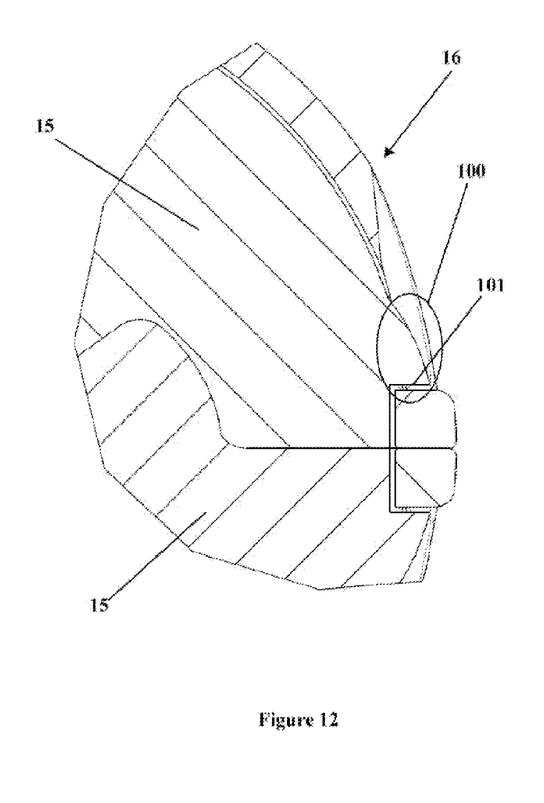
FIG. 12 is a detailed view of the portion identified by reference numeral "A" in FIG. 11.
Figure 13:
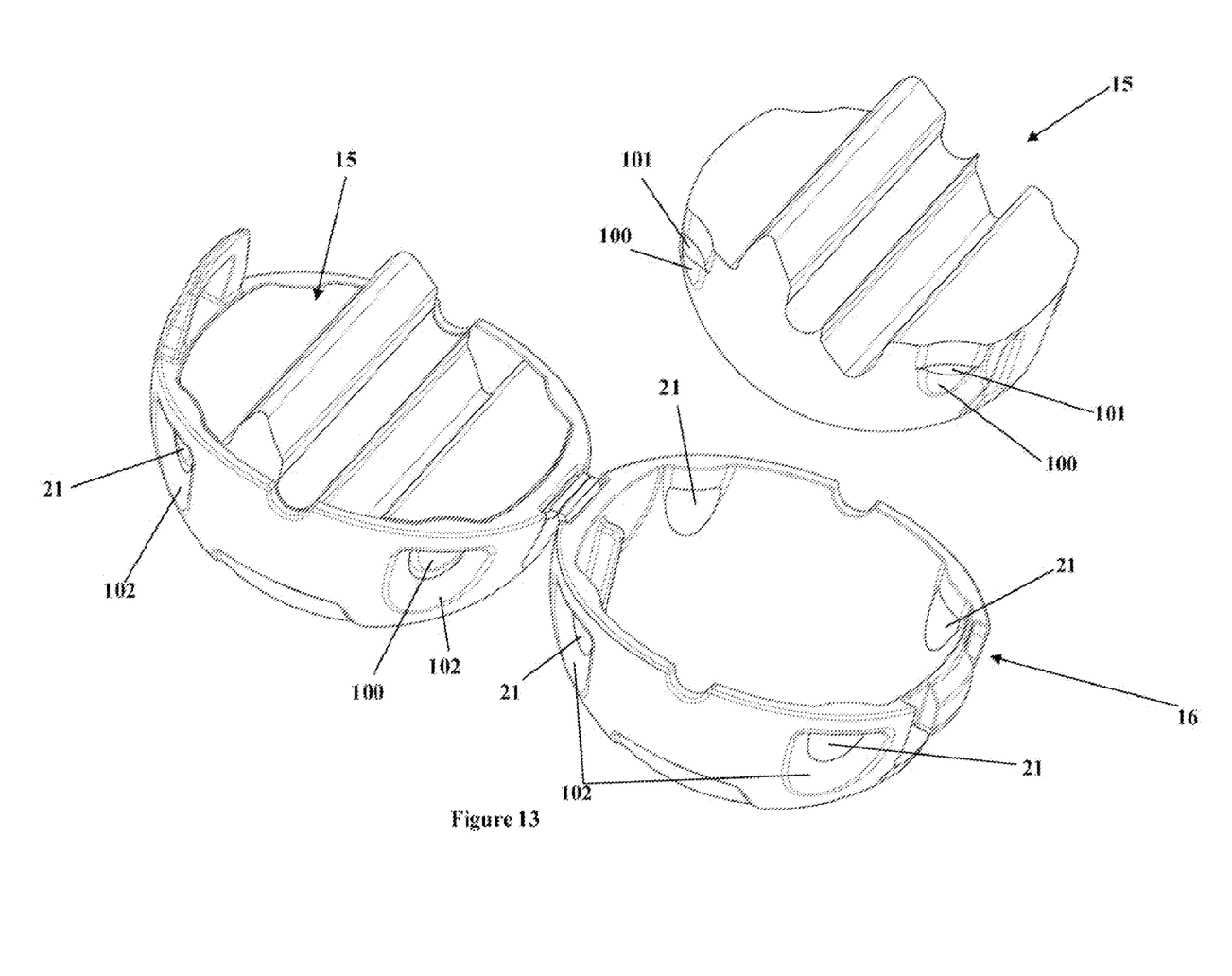
FIG. 13 is an isometric view of the sinker according to FIG. 10 in the open condition with one of the material portions exploded from the respective jacket portion.
Figures 14, 14A:
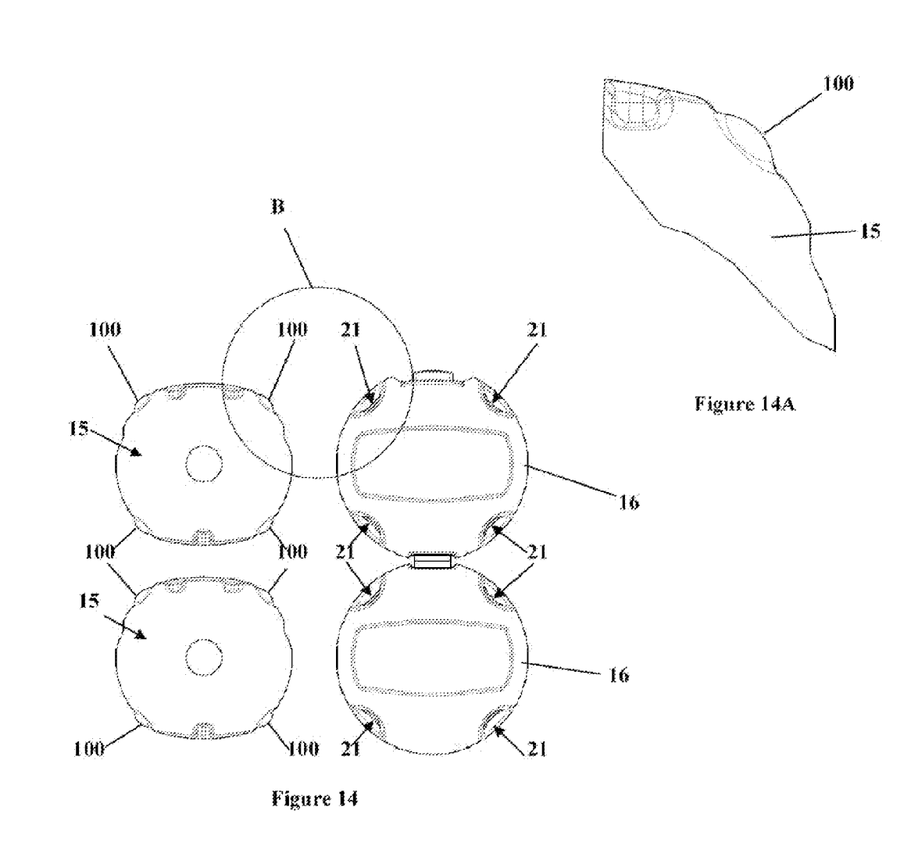
Figure 14B:
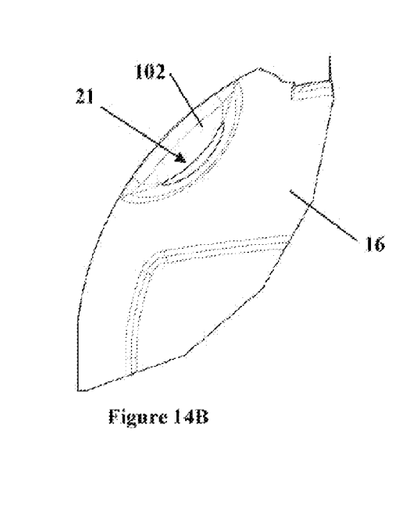
Figure 15:
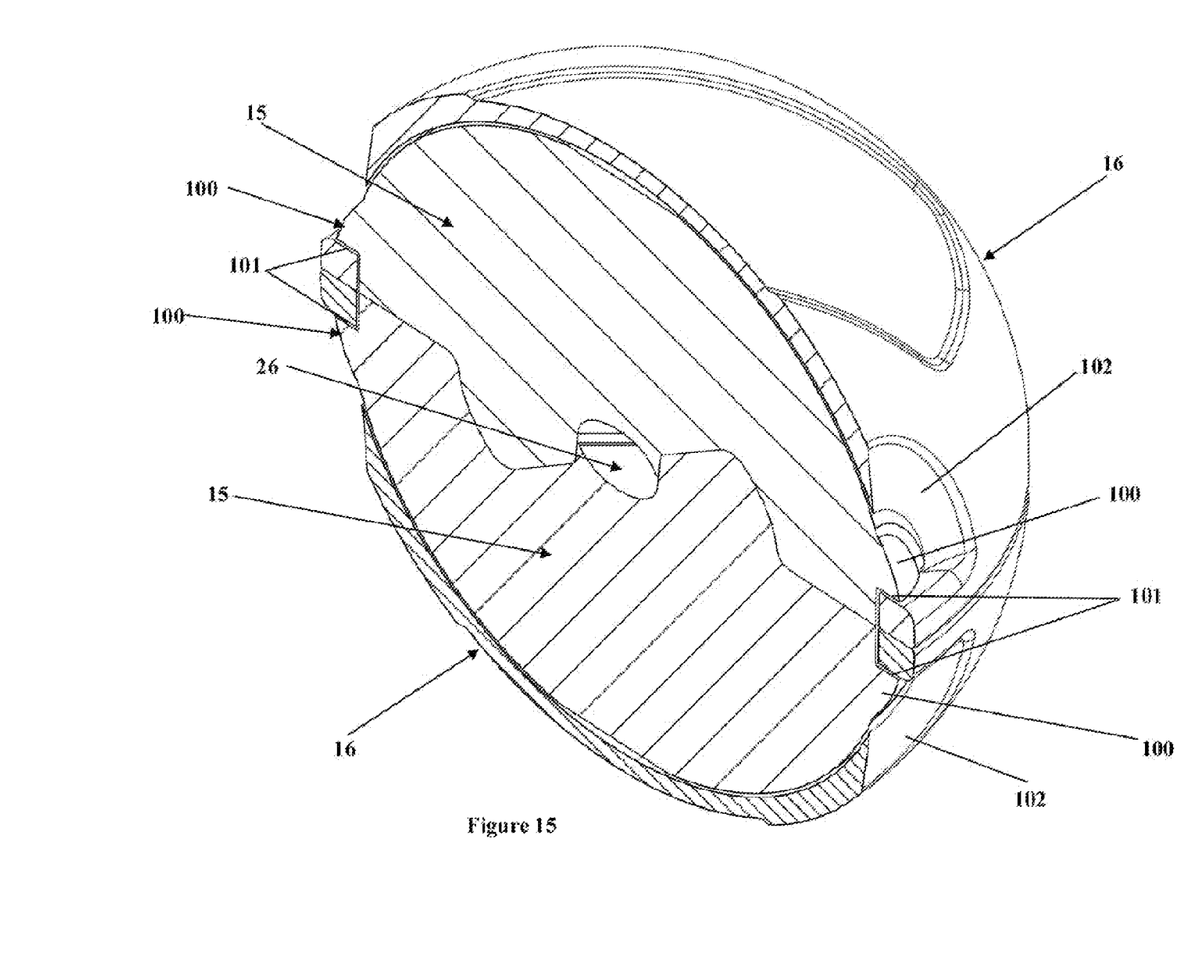
FIG. 15 is an isometric view of FIG. 11.

As illustrated more clearly in FIG. 10, each of the inner material portions 15 includes a number of protrusions 100. Each of the protrusions 100 has an abutment shoulder 101 formed in a surface of the inner material portion 15 and standing proud of the surface of the inner material portion 15.

As illustrated, each of the apertures 21 has a tapered surround portion 102 surrounding the apertures 21. In use, the inner material portions 15 forced into the jacket with the protrusions 100 aligned with the apertures 21 such that the abutment shoulder 101 of each of the protrusions 100 engages with one edge of the aperture 21. This will generally require some resilient deformation of the jacket 16 as the protrusion 100 is forced into the jacket 16.

Normally, the edge of the apertures 21 with which the abutment shoulder 101 engages is a substantially planar edge and the abutment shoulder 101 itself is normally substantially planar.

It is to be understood that the terminology employed above is for the purpose of description and should not be regarded as limiting.

The foregoing embodiments are intended to be illustrative of the invention, without limiting the scope thereof. The invention is capable of being practised with various modifications and additions as will readily occur to those skilled in the art.

Throughout this specification, including the claims, where the context permits, the term "comprise" and variants thereof such as "comprises" or "comprising" are to be interpreted as including the stated integer or integers without necessarily excluding any other integers.

The invention claimed is:

1. A sinker or float that releasably clamps around a line, comprising:
   i) two weight or float members, each member comprising a material having a density higher than water to provide a sinking effect or a material having a density lower than water to provide a floating effect, each member having:
   a) an inner surface for abutment of an opposed weight or float member of said two weight or float members when in a closed position, the inner surface having a channel portion therein shaped to define a channel for the line when in a closed position,
   b) at least one protrusion having an abutment shoulder standing proud of a shaped outer surface of each member; and,
ii) a jacket having:
   a) a pair of clamshell jacket portions wherein the jacket portions are hingedly connected to each other, each jacket portion for receiving at least a portion of one of the two members, each jacket portion having one or more apertures extending through a wall of the jacket portion, wherein each one or more apertures receives and retains a portion of the at least one protrusion of the respective member within a corresponding portion of the aperture and a portion of the one or more apertures removably engages via abutment with the at least one abutment surface of the respective member to prevent removal of the member from the jacket portion unless the jacket portion is deformed, and,
   b) a locking assembly for reliably locking the jacket portions in the closed position, wherein the locking assembly comprises a resilient tab associated with one of the jacket portions that clips onto, or into, a corresponding tab receiving portion associated with the other jacket portion.

2. A sinker or float according to claim. 1, wherein the two members are hingedly connected.

3. A sinker or float according to claim 1. wherein the locking assembly is integral with the jacket with a first part of the locking assembly provided on one of the jacket portions and a second part of the locking assembly provided on the other of the jacket portions.

4. A sinker or float according to claim 1, wherein the jacket is resilient.

5. A sinker or float according to claim 1, wherein the jacket is shaped to align the respective member retained therein in a particular orientation.

6. A sinker or float according to claim 1, wherein at least one of the members has a raised portion and the other a corresponding recessed portion, wherein the corresponding recessed portion is adapted to receive the raised portion when the two members are in the closed position.

7. A sinker or float according to claim 1, wherein the members are removable from the jacket portions.

8. A sinker or float according to claim 1, wherein the channel is substantially straight.

9. A sinker or float according to claim 1, wherein the one or more apertures receives and fixedly retains the portion of one of the two members to retain the respective member within the respective jacket portion.

10. A sinker or float according to claim 5 wherein the jacket includes an aligning protrusion that is received by a corresponding recess in the respective member.

11. A sinker or float according to claim 6 wherein each member has both a raised portion and a corresponding recessed portion, wherein the recessed portions are adapted to receive respective raised portions.

12. A sinker or float according to claim 6, wherein the raised portions and recessed portions are adjacent the channel.

13. A sinker or float according to claim 6, wherein the raised portions and recessed portions extend substantially the lengths of the members.

14. A sinker or float that releasably clamps around a line, comprising:
   i) two weight or float members, each comprising a material having a density higher than water to provide a sinking effect or a material having a density lower than water to provide a floating effect, each member having:
      a) an inner surface for abutment of an opposed weight or float member when in a closed position said inner surface of at least one of the members shaped to define a channel for the line when in the closed position; and
      b) at least one protrusion having an abutment shoulder standing proud of a shaped outer surface of the member;
   at least one of the weight or float members having a raised portion standing proud of the inner surface adjacent to the channel and the other member has a corresponding recessed portion for receiving the raised portion when the two members are in a closed position;
   ii) a jacket having a pair of clamshell jacket portions for receiving at least a portion of one of the two members, each jacket portion having one or more apertures extending through a wall of the jacket portion, wherein each one or more apertures receives and retains a portion of the at least one protrusion of the respective member within a corresponding portion of the aperture and a portion of the one or more apertures removably engages via abutment with the at least one abutment surface of the respective member to prevent removal of the member from the jacket portion unless the jacket portion is deformed, wherein the jacket further comprises a hinge means that hingedly connects the jacket portions; and
   iii) a locking means for releasably locking the two members in the closed position.

15. A sinker or float according to claim 14, wherein the sinker or float is reusable.

* * * * *